United States Patent [19]

Akashi et al.

[11] 4,035,735
[45] July 12, 1977

[54] DEMODULATOR COMPRISING A PHASE SHIFT CIRCUIT FOR CONTROLLING OUTPUTS OF AN AUTOMATIC EQUALIZER

[75] Inventors: Fumio Akashi; Yoichi Sato, both of Tokyo, Japan

[73] Assignee: Nippon Electric Company, Ltd., Tokyo, Japan

[21] Appl. No.: 647,543

[22] Filed: Jan. 8, 1976

[30] Foreign Application Priority Data

Jan. 8, 1975 Japan .............................. 50-4788

[51] Int. Cl.² .................................. H03D 1/06
[52] U.S. Cl. .................. 329/50; 325/476; 325/480; 328/155; 329/145; 329/178
[58] Field of Search ............. 329/50, 145, 178; 325/473–476, 480; 328/155

[56] References Cited

U.S. PATENT DOCUMENTS

| 3,271,742 | 9/1966 | Rumble et al. | 329/145 X |
| 3,646,252 | 2/1972 | Verstraelen et al. | 329/50 X |
| 3,971,996 | 7/1976 | Motley et al. | 328/155 |

*Primary Examiner*—Siegfried H. Grimm
*Attorney, Agent, or Firm*—Sughrue, Rothwell, Mion, Zinn and Macpeak

[57] ABSTRACT

A demodulator responsive to baseband signals from a coherent detector having an automatic equalizer part for supplying equalized signals to derive transmitted datum and a phase control part responsive to equalized signals. The automatic equalizer part includes a delay member with a plurality of taps and variable attenuators connected to the respective taps of the delay member. The phase control part is provided with a phase shift circuit such as a coherent detector and a control circuit for detecting phase variation components of equalized signals. Further, the control circuit feeds phase variation components detected to the phase shift circuit and simultaneously supplies error signals which are dependent on phase variation components to the respective variable attenuators of the automatic equalizer.

9 Claims, 5 Drawing Figures

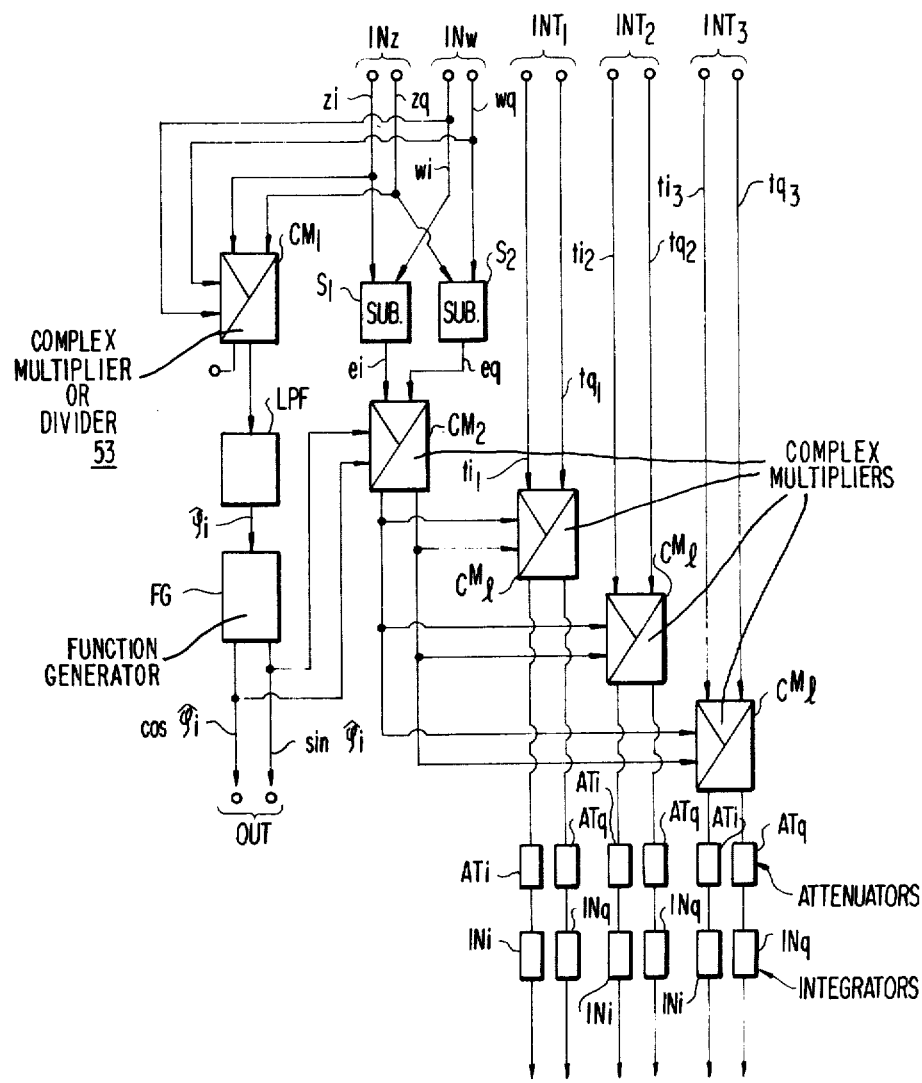
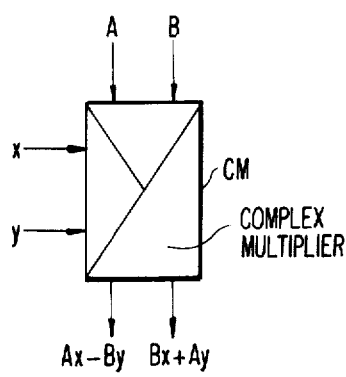

DEMODULATOR COMPRISING A PHASE SHIFT CIRCUIT FOR CONTROLLING OUTPUTS OF AN AUTOMATIC EQUALIZER

BACKGROUND OF THE INVENTION

This invention relates to a receiver device of multi-level amplitude modulated signals and, more particularly, to a receiver device for demodulating transmitted signals guadrature amplitude modulated.

This type of receiver is provided with a coherent detector for converting transmitted signals into baseband signals and, a demodulator for deriving multi-level datum from baseband signals.

A conventional demodulation of the type described comprises an adaptive automatic equalizer which removes any intersymbol interference of baseband signals supplied from the coherent detector and feeds equalized signals to a discriminator predicting a transmitted datum. In the automatic equalizer, there is prepared a pair of delay lines with taps each of which is responsive to an in-phase and a quadrature phase components of the baseband signals, respectively. By controlling each tap gain of the delay lines, the amplitude and phase of the signal received can be simultaneously controlled therein.

However, when a carrier within transmitted signals undergoes any frequency offset and any other phase shift jitter, in a transmission line or a MODEM, the automatic equalizer cannot sufficiently absorb these fluctuations or phase variations.

Heretofore, to reduce the influence of phase variation, it has been proposed to feed back phase errors derived from correlation between outputs of the automatic equalizer and predictive values of transmission datum to a voltage controlled oscillator of the coherent detector. But, this proposal is too slow, in comparison to speed of the system because of the delay time from edge taps of the equalizer to central taps thereof.

SUMMARY OF THE INVENTION

It is therefore an object of this invention to provide a demodulator which is capable of obviating any phase variation such as frequency offset and phase shift jitter of a carrier received to a data receiver, for feeding optimum values as output signals.

It is a further object of the invention to provide a demodulator in which variable attenuators of an adaptive automatic equalizer are adjusted by error signals dependent on phase variation.

It is yet a further object of the invention to provide a demodulator which comprises a phase shift circuit such as a coherent detector responsive to outputs of an automatic equalizer to derive phase variation.

It is a further object of this invention to provide a control circuit which comprises a function generator producing cosine and sine waves in compliance with phase variation detected therein.

It is still a further object of this invention to provide a control circuit in which imaginary parts of complex numbers are derived to produce phase control signals.

It is another object of this invention to provide a receiver system which comprises a coherent detector having an oscillator independent of a demodulator.

According to this invention, there is provided a demodulator comprising an automatic equalizer part for equalizing transmitted signals quadrature amplitude modulated and a phase control part for receiving phase variation components in equalized signals. The automatic equalizer comprises delay means with taps, a plurality of variable attenuators connected to the respective taps of delay means, and adder means for obtaining the total sum of the outputs of the variable attenuators. Further, the phase control part includes a phase shift circuit such as a coherent detector and a control circuit which derives phase variation components in equalized signals. Phase variation components derived in the control circuit are supplied to the phase shift circuit. At the same time, modification values of tap gains in the respective variable attenuators are also controlled by phase variation components detected in the control circuit. Therefore, phase variation components such as phase shift jitter and frequency offset are absorbed within this demodulator without a feed back loop connected to a coherent detector in response to transmitted signals. Hence, in the coherent detector, an inherent or fixed oscillator is capable of being employed to detect quadrature amplitude modulated signals.

BRIEF DESCRIPTION OF THE DRAWING

FIG. 4 is a block diagram of a preferred control circuit used in a demodulator according to this invention; and FIG. 5 shows a symbol of a complex multiplier depicted in FIG. 4.

DESCRIPTION OF THE PREFERRED EMBODIMENTS

Figure 1:
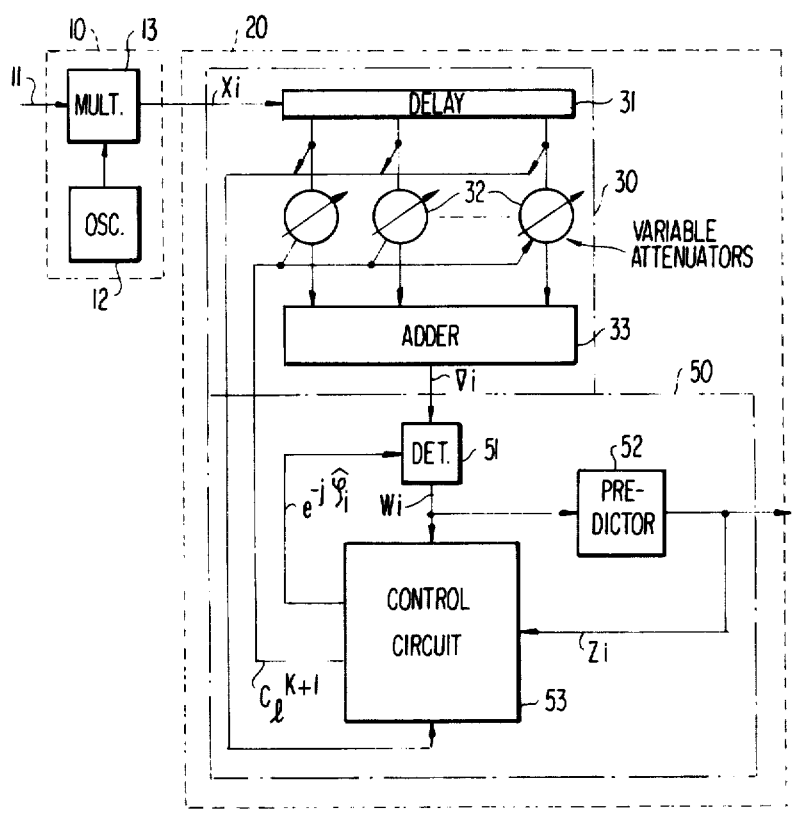
FIG. 1 is a block diagram of a receiver system including a demodulator according to this invention.

In FIG. 1, there is shown a receiver which has a coherent detector 10 which is responsive to transmitted signals quadrature amplitude modulated from a transmission line 11 and a demodulator 20 according to this invention. The coherent detector 10 is provided with an oscillator 12 having an inherent or fixed frequency adjacent to a carrier frequency of transmitted signals and a multiplier 13 for feeding baseband signals. Since transmitted signals in this embodiment are quadrature amplitude modulated by multi-level datum at a transmitter (not shown), the oscillator 12 feeds a pair of equal frequency signals in quadrature phase to each other as regenerative carriers to derive in-phase and quadrature components within a baseband width at the multiplier 13.

Now, it is assumed that the impulse response of the transmission line 11 is $$h(t) = p(t) \cos \omega_c t + q(t) \sin \omega_c t \qquad (1)$$

where $\omega_c$ is an angular frequency of the carrier of transmitted signals.

Further, when $a_n$ and $b_n$ are representative of multi-level datum transmitted, and T is an interval of datum, a pair of outputs $x(t)$ and $y(t)$ of the coherent detector 10 are represented by the following equations;

$$x(t) = \sum_{-\infty}^{+\infty} \{a_n p(t - nT) \cos((\omega_c - \omega_0)t - \theta(t))$$

$$- b_n q(t - nT) \sin((\omega_c - \omega_0)t - \theta(t))\} \qquad (2)$$

-continued $$y(t) = \sum_{-\infty}^{+\infty} \{a_n g(t - nT) \cos((\omega_c - \omega_0)t - \theta(t))$$
$$+ b_n p(t - nT) \sin((\omega_c - \omega_0)t - \theta(t))\} \quad (3)$$

where $\omega_0$ is an angular frequency of the regenerative carrier from the oscillator.

Referring to the equations (2) and (3), it is apparent that the outputs of the coherent detector 10 undergo a stationary frequency offset of $(\omega_c - \omega_0)$ and any other phase shift jitter of $\theta(t)$.

Subsequently, considering the response at a specified timing, for example, $t = iT$, the equations (2) and (3) are replaced by the following equations (4) and (5);

$$x_i = \Sigma_n \{a_n p_i - n \cos\phi_i - b_n q_i - n \sin\phi_i\} \quad (4)$$
$$y_i = \Sigma_n \{a_n q_i - n \cos\phi_i + b_n p_i - n \sin\phi_i\} \quad (5)$$

where, $\phi_i = (\omega_c - \omega_0)iT + \theta(iT)$, $x_i = x(iT)$, $y_i = y(iT)$, $p_{i-n} = P\{(i-n)T\}$ and $q_{i-n} = q\{(i-n)I\}$.

Further, when the foregoing expressions (4) and (5) are represented by complex numbers, $$X_i = \sum_n A_n P_{i-n} e^{j\phi_i} \quad (6)$$

where, $X_i = x_i + jy_i$, $P_i = p_i + jq_i$ and $A_i = a_i + jb_i$.

Therefore, in the demodulator, phase fluctuation components $e^{j\phi_i}$ in the above equation (6) are to be removed therein.

The demodulator 20 includes an automatic equalizer part 30 and a phase control part 50. The automatic equalizer part 30 is provided with a delay member 31 with taps, a pluraliity of variable attenuators 32 connected to each tap of the delay member 31 and an adder member 33. The phase control part 50 in response to outputs of the equalizer part 30 has a coherent detector 51, a predictor 52 and a control circuit 53.

In the automatic equalizer part 30, if an attenuation factor or a modification value of each attenuator 32 is given by the complex notation of $C_1 = c_1 + jd_1$, an output $V_i$ of the equalizer part 30 is $$V_i = \sum_{l=-n}^{+n} C_l X_{i-l} \quad (7)$$

Each tap gain of delay member 31 is modified or adjusted by each of the variable attenuators in compliance with the conventional mean square equalization. The algorithm may be defined by $$C_1^{k+1} = C_1^k - \alpha X_k^* {}_{-l} E_k \quad (8)$$

where $k$ represents the number of times of the gain adjustment, * represents a complex conjugate number, $\alpha$ represents a modified coefficient of a small positive constant, and $E_i (= V_i - A_i)$ represents an error component. Each modification value of tap gain is adjusted so that the sum of mean square values of $E_i$ becomes minimum due to the algorithm (8), but an input signal supplied to the demodulator 20 is momentarily phase-shifted as apparent from the formula (6). Since in a conventional demodulator, optimum values of modification values prior to one time slot are used as desired values at a present time slot, it is difficult to absorb phase variation $\phi_i$ of the input signal. It is the purpose of this invention to introduce a predictive value $\hat{\phi}_i$ of phase variation $\phi_i$ and to produce a phase control signal of $e^{-j\hat{\phi}_i}$ to obviate a phase variation component $e^{j\phi_i}$. $e^{j\phi_i}$.

Referring to FIG. 1, again, the phase control part 50 of the demodulator 20 provides the coherent detector 51 to multiply phase control signal of $e^{-j\hat{\phi}_i}$ derived from the control circuit 53 by output $V_i$ of the equalizer part 30. Thus, an output $W_i$ of the coherent detector 51, is represented by the next formula;

$$W_i = V_i e^{-j\hat{\phi}_i} \quad (9)$$

The control circuit 53 receives output $W_i$ of the coherent detector 51, a predictive value $Z_i$ of the predictor 52 and, each tap signal of the delay number 31. Therefore, this control circuit 53 produces phase control signal of $e^{-j\hat{\phi}_i}$ from output $W_i$ of the coherent detector 51 and predictve value $Z_i$ from the predictor 52. Moreover, in this control circuit 53, modification values $C_1$ of variable attenuators 32 are adjusted in compliance with the following algorithm;

$$C_1^{k+1} = C_1^k - \alpha X_{k-l}^* E_k e^{j\hat{\phi}_i} \quad (10)$$

As apparent from the above expression (10), modification values $C_1^{k+1}$ of the respective variable attenuators 32 depend on phase control signal of $e^{-j\hat{\phi}_i}$ to remove any phase variation of error signal $E_i$ due to phase control of the type described above.

Figure 2:
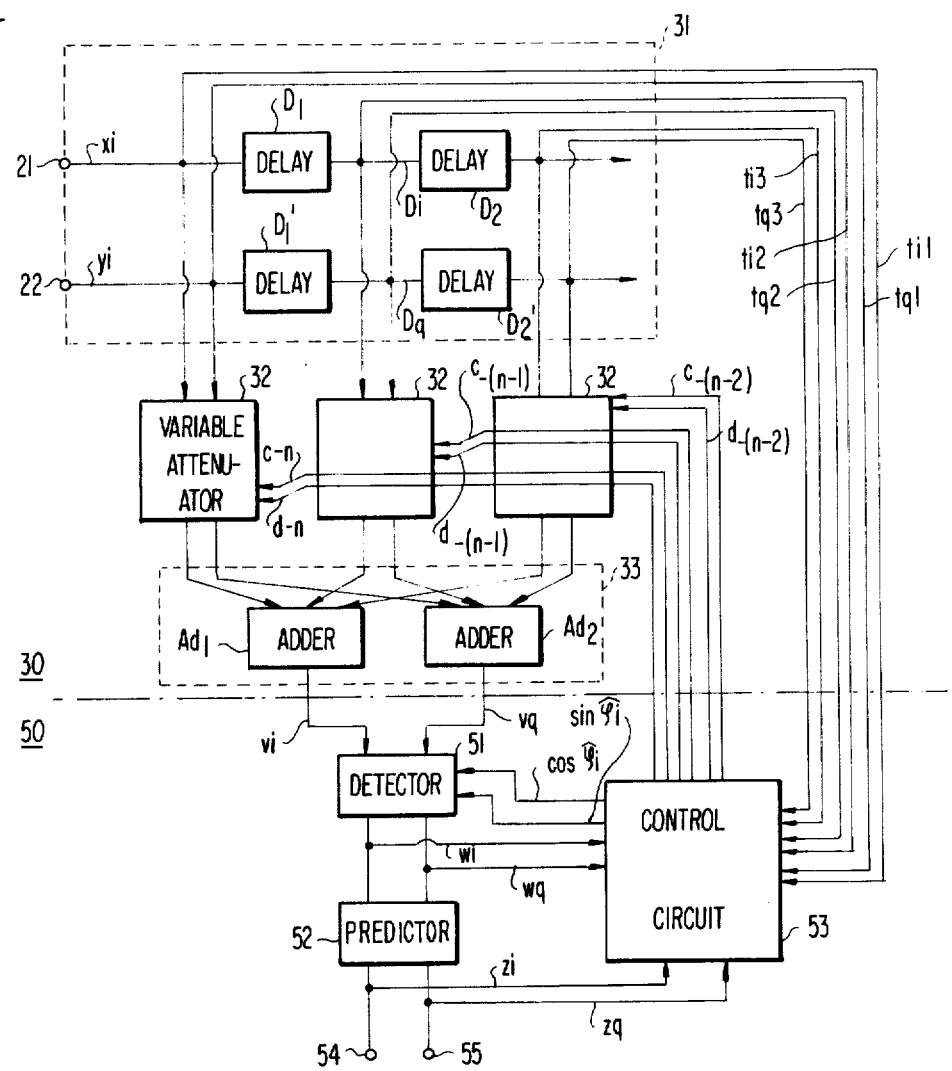
FIG. 2 is a block diagram of a demodulator according to a preferred embodiment of this invention.
Figure 3:
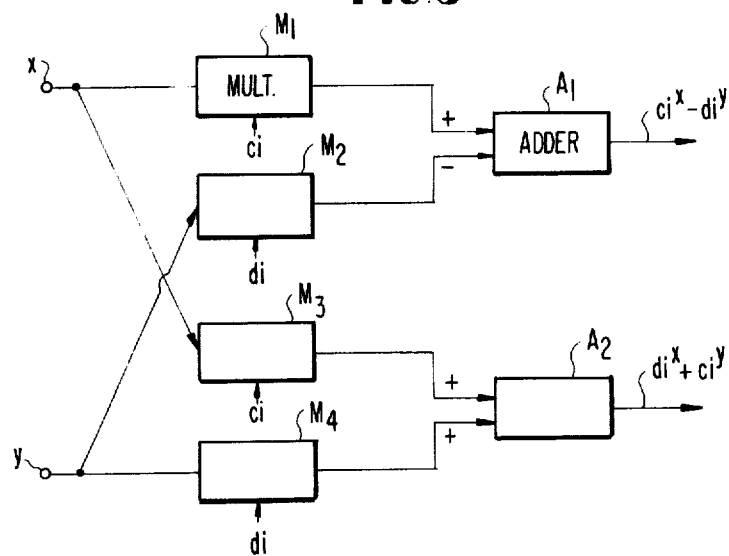
FIG. 3 shows a variable attenuator used in this invention.

Referring to FIGS. 2 and 3, the demodulator 20 according to this invention is explained in detail. The delay member 31 of the automatic equalizer part 30 comprises a pair of delay lines $D_i$ and $D_q$ having a plurality of taps and a pair of input terminals 21 and 22. Each of delay lines $D_i$ and $D_q$ comprises a plurality of delay units D1, D2 and D1', D2' connected in series, respectively. Corresponding taps of delay lines $D_i$ and $D_q$ are connected to the respective tap gain circuits 32 which are constructed by variable attenuators. Variable attenuators 32 as complex operation means include four multipliers M1–M4 and two adders A1, A2 for calculation on a complex plane in compliance with foregoing formula (7) as shown in FIG. 3. Thus, in-phase components including any intersymbol interference from taps of delay line $D_i$ are supplied to two multipliers M1 and M3 responsive to in-phase components $c_i$ of modification values $C_i$ while quadrature components $y$ from taps of delay line $D_q$ are fed to the remaining multipliers M2 and M4 responsive to quadrature components $d_i$ of modification values $C_i$ of tap gains. Products of multipliers M1 and M2 are fed to adder A1 to obtain first outputs of $c_i x - d_i y$ and products of multipliers M3 and M4 are respectively sent to adder A2 to feed outputs of $d_i x + c_i y$. Referring to FIG. 2 again, each of the first outputs from the respective variable attenuators 32 is supplied to a first adder circuit A$d$1 of adder member 33 while each of the second outputs is supplied to a second adder circuit A$d$2. The respective sums of the first and second adders A$d$1, A$d$2 are fed to the coherent detector 51 of the phase control part 50 as complex signals $V_i$ including in-phase and quadrature components $v_i$ and $v_q$ to execute complex operation as well as each variable attenuator 32. The coherent detector 51 is supplied with phase control signal of $e^{-j\hat{\phi}_i}$ from the control circuit in order to remove phase variation components $e^{j\phi_i}$ within complex signals of the automatic equalizer part 30. Thus, in the coherent detector 51, complex signals $V_i$ are phase-shifted in accordance with the phase control signal. Phase-shifted complex signals $W_i$ are fed to the control circuit 53 as well as the predictor 52 for sending predictive values $Z_i(= z_i + jz_q)$ of transmitted datum to output terminals 54 and 55.

Referring to FIG. 4, there is shown one embodiment of the control circuit 53 used for this invention. The control circuit 53 comprises a plurality of complex multipliers CM depicted in FIG. 5, two subtractors S1, S2 and a function generator FG feeding sine and cosine waves in accordance with phase variation predicted in this control circuit 53. At first, complex multipliers CM, which receive a pair of input signals A and B with another pair of input signals $x$ and $y$, supply a pair of outputs $Ax + By$ and $bx + Ay$, as shown in FIG. 5. Thus, this circuit executes multiplication between complex numbers $x + jy$ and $A + jB$.

In FIG. 4, a pair of predictive values $z_i$ and $z_q$ through a pair terminals INZ and a pair of complex signals $w_i$ and $w_q$ through a pair terminals INW are fed to a complex multiplier CM1 and two subtractors S1 and S2. Imaginary parts of outputs of the complex multiplier CM1 are supplied to the function generator FG through a low pass filter LPF as predictive values $\hat{\phi}_i$ of phase variation. Thus, this control circuit 53 approximates phase variation by the selection of imaginary parts of outputs. Predictive values $\hat{\phi}_i$ of phase variation are supplied to the function generator FG for producing a pair of cosine and sine waves ($\cos\hat{\phi}_i$ and $\sin\hat{\phi}_i$) in compliance with predictive values $\hat{\phi}_i$ supplied. The function generator FG comprises, for example, an address decoder for converting predictive values $\hat{\phi}_i$ into the corresponding address signals and a read only memory (ROM) circuit for memorizing values of cosine and sine functions at predetermined phase intervals. Memorized values of the ROM circuit are read out at predetermined speed and as a result, digitalized cosine and sine functions are generated from the function generator FG.

On the other hand, the subtractor S1 calculates the difference between complex signals $w_i$ and predictive values $z_i$ to derive error signals $e_i$ of in-phase components while the subtractor S2 calculates the difference between complex signals $w_q$ and predictive values $z_q$ to derive error signals $e_q$ of quadrature components. A pair of error signals $e_i$, $e_q$ and phase control signals $\cos \hat{\phi}_i$ and $\sin \hat{\phi}_i$ are fed to a complex multiplier CM2 to phase-shift error signals $E_i$ as shown in the foregoing formula (10). Products of complex multiplication at the complex multiplier CM2 are respectively given to a plurality of complex multipliers CM$\phi$ each of which receives a pair of tap signals $t_i$ and $t_q$ through pair input terminals INT1, INT2, INT3 . . . . The respective complex multipliers CM$\phi$, which are responsive to error signals phase-shifted, multiply each of tap signals $t_i$, $t_q$ by phase-shifted error signals to adjust modification values of tap gains. The resultant products of the respective complex multipliers CM$\phi$ are sent to the corresponding variable attenuators 32 through pairs of attenuator circuits $AT_i$, $AT_q$ and pairs of integrators $IN_i$, $IN_q$ as modification values which are attenuation control signal pairs $C_i$ for the variable attenuators.

It will be easily seen that a divider may be used instead of a complex multiplier $CM_1$ in this invention to derive imaginary parts in accordance with the next algorithm;

$$\frac{W}{Z} = e^{j\hat{\phi}_i} = \cos \hat{\phi}_i + j\sin \hat{\phi}_i$$

where $W = Ze^{j\phi_i}$. Further, a demodulator according this invention is capable of being realized by a digital circuit when an analog to digital converter is connected to each of input terminals 21 and 22 of delay lines $D_i$ and $D_q$.

It will be now appreciated that a demodulator according to this invention connects a phase shift circuit such as a coherent detector to an output terminal of an adaptive automatic equalizer. In addition, the phase shift circuit and variable attenuators are controlled in compliance with phase errors derived from outputs of the phase shift circuit and predictive values of transmitted datum and, therefore, this demodulator is capable of removing stationary phase errors.

What is claimed is:

1. A demodulator responsive to baseband signals recovered by a coherent detector from quadrature amplitude modulated signals sent thereto through a transmission line, said baseband signals comprising complex signal pairs representative of a sequence of complex communication codes at regularly spaced instants, said demodulator comprising, for demodulating said baseband signals into predicted values of said communication codes;

delay mans for delaying said baseband signal pairs, said delay means having a plurality of tap means for simultaneously deriving from the delayed baseband signal pairs a plurality of successively delayed complex signal pairs;

a plurality of variable attenuator means responsive to attenuation control signal pairs for attenuating the respective delayed complex signal pairs by attenuation factors controlled by the respective attenuation control signal pairs to produce amplitude-adjusted signal pairs;

adder means for summing up said amplitude-adjusted signal pairs to produce a pair of complex sum signals at each of said instants;

phase shift means responsive to a phase control signal pair for phase-shifting said complex sum signal pair depending on said phase control signal pair to produce a pair of phase-controlled complex sum signals;

predicting means responsive to said phase-controlled complex sum signal pair for producing a pair of complex value signals predictive of that pair of said communication codes which is comprised by said baseband signals;

first control means responsive to said phase-controlled complex sum signal pair and said complex value signal pair for producing the phase control signal pair for use by said phase shift means; and second control means responsive to said phase control signal pair, said phase-controlled complex sum signal pair, said complex value signal pair and said delayed complex signal pairs for producing the attenuation control signal pairs for use by said variable attenuator means;

said predicted values being given by the complex value signal pairs successively produced for said instants.

2. A demodulator as claimed in claim 1, wherein said first control means comprises a phase detecting circuit responsive to said phase-controlled complex sum signal pair and said complex value signal pair for detecting a complex phase variation pair of said phase-controlled complex signal pair in comparison with said complex value signal pair at each of said instants to produce an imaginary component of said complex phase variation pair, and a function generator responsive to said imaginary component for producing a pair of cosine and sine waves as said phase control signal pair.

3. A demodulator as claimed in claim 2, wherein said function generator comprises a read only memory responsive to said imaginary component and memorizing digital values of a pluralilty of cosine and sine wave pairs for digitally producing said phase control signal pair.

4. A demodulator as claimed in claim 2, wherein said phase detecting circuit comprises a complex multiplier for multiplying said phase-controlled complex signal pair by said complex value signal pair to approximately produce said complex phase variation pair.

5. A demodulator as claimed in claim 2, wherein said phase detecting circuit comprises a complex divider for dividing said phase-controlled complex signal pair by said complex value signal pair to produce said complex phase variation pair.

6. A demodulator as claimed in claim 2, wherein said second control means comprises a pair of subtractor means for calculating differences between said phase-controlled sum signal pair and said complex value signal pair to produce a complex error signal pair and a complex multiplier for multiplying said complex error signal pair by said phase control signal pair to produce a phase-shifted complex error signal pair.

7. A demodulator as claimed in claim 6, wherein said phase shift means comprises a coherent detector responsive to said complex sum signal pair and said phase control signal pair for producing said phase-controlled complex sum signal.

8. A demodulator as claimed in claim 7, wherein said second control means further comprises a plurality of complex multipliers responsive to said phase-shifted complex error signal pair and the respective delayed complex signal pairs produced at the respective tap means for producing said attenuation control signal pairs relating to said phase-shifted complex error signal pair.

9. A demodulator as claimed in claim 8, wherein said phase detecting circuit comprises a complex multiplier for multiplying said phase-controlled complex signal by said complex value signal pair to approximately produce said complex phase variation pair.

* * * * *